Patented Oct. 25, 1932

1,885,060

UNITED STATES PATENT OFFICE

FRITZ HOFMANN, OF BRESLAU, MICHAEL OTTO, OF LUDWIGSHAFEN-ON-THE-RHINE, AND WALTER STEGEMANN, OF MONHEIM-ON-THE-RHINE, GERMANY

POLYMERIZATION OF OLEFINES

No Drawing. Application filed November 8, 1929, Serial No. 405,719½, and in Germany June 28, 1927.

It has already been proposed to polymerize olefines with the aid of boron fluoride.

We have found that this reaction is greatly accelerated by being carried out in the presence of hydrogen halides or of substances furnishing hydrogen halides. For example, an addition of hydrogen fluoride or of substances furnishing hydrogen fluoride yields good results. The presence of moisture therefore also has an accelerating effect, since it furnishes hydrogen fluoride by interaction with the boron fluoride present. Also hydrogen iodide, hydrogen bromide, hydrogen chloride or substances furnishing them under the conditions of working as, for example, the halogen compounds of aliphatic or aromatic hydrocarbons or such halogen compounds, in particular such of organic nature as split off halogens or halogen halides in the Friedel-Craft's reaction, such as acid halogenides and the like have a good effect.

Ethylene, propylene, butylene or cyclohexene and mixtures of these substances may be mentioned as examples of open chain or cyclic olefines coming into question as initial materials according to the process of the present invention.

The polymerization products derived from the said olefines or mixtures of olefines correspond in their composition to the general formula $C_nH_{2n}$ and are usually more or less viscous oils.

The following examples will further illustrate the nature of the invention, but the invention is not limited thereto. The parts are by weight.

Example 1

100 parts of ethylene when treated with 10 parts of boron fluoride (absolutely dry) yield 10 parts of oil in 14 hours.

100 parts of moist ethylene when treated with 10 parts of boron fluoride yield 90 to 95 parts of oil in 8 to 12 hours.

100 parts of ethylene when treated with 10 parts of boron fluoride and 2 to 3 parts of hydrogen fluoride, all absolutely dry, yield 90 to 95 parts of oil in 3 to 4 hours.

The conditions of working as regards temperature and pressure are the same in all cases.

Example 2

3 parts of boron fluoride are added to 100 parts of dry propylene and are shaken therewith at room temperature for 15 hours; a yield of 30 parts of oil is thus obtained.

If in the process according to the foregoing paragraph moist propylene is employed under the same conditions of working a yield of 70 to 75 parts of oil is obtained.

If 3 parts of boron fluoride and 1 part of hydrogen fluoride be added to 100 parts of propylene quantitative polymerization takes place already in half an hour.

Example 3

2 parts of boron fluoride are added to 100 parts of dry butylene; after 18 hours a yield of about 35 parts of oil is obtained.

If under the same conditions as those employed in the process according to the foregoing paragraph moist butylene is employed a yield of 70 parts of oil is obtained already in 2 hours.

100 parts of butylene when treated together with 2 parts of boron fluoride and 1 part of hydrogen fluoride yield 90 parts of oil in a quarter of an hour.

The products obtained according to Examples 2 and 3 irrespectively of whether they are prepared from moist or dry olefines do not differ very considerably from one another. Under reduced pressure of 10 mm mercury gauge 30 per cent thereof boil from 100 to 160° C., 50 per cent from 160 to 240° C. and 20 per cent above about 240° C.

Example 4

100 parts of dry cyclohexene (a cyclic olefine) are treated together with 6 parts of boron fluoride; after 15 hours about 25 per cent of the olefine are polymerized.

If in the process according to the foregoing paragraph 1 part of hydrogen fluoride is added, the cyclohexene is polymerized quantitatively in the same time.

The products obtained according to the process according to the two foregoing paragraphs are subjected to steam distillation.

In the case of the process according to the first paragraph, about 10 parts of a residue are obtained consisting of a viscous oil. The constituent distilled over with the steam has a refraction index of 1.4581.

In the case of the product obtained according to the process described in the second paragraph, the residue consists of 15 parts of a highly viscous oil. The constituent volatilized with the steam has a refraction index of 1.4932.

By fractionation of the constituent volatilized with steam, it was found that in the case of the product obtained according to the process described in the first paragraph 75 per cent of cyclohexene are recovered unchanged and that the remaining 15 per cent boil at a temperature of about 95° C. under a reduced pressure of 12 mm mercury gauge. This constituent had a refraction index of 1.4932 and could be identified as cyclohexyl-cyclohexene (the dimer of cyclohexene). 80 parts of this latter product were obtained from the product obtained according to the process described in the foregoing paragraph.

*Example 5*

100 parts of ethylene when treated together with 10 parts of boron fluoride and 12 parts of hydrogen iodide under an initial pressure of 100 atmospheres yield 75 parts of oil in 10 hours.

*Example 6*

100 parts of ethylene are treated together wth 10 parts of boron fluoride and 5 parts of ethyl fluoride under an initial pressure of 130 atmospheres for 10 hours, 100 parts of oil being thus obtained.

*Example 7*

100 parts of ethylene are treated together with 10 parts of boron fluoride and 12 parts of ethyl chloride with an initial pressure of 130 atmospheres for about 10 hours, 95 parts of oil being thus obtained.

What we claim is:

1. In the polymerization of olefines of the general formula $(C_nH_{2n})$ with the aid of boron fluoride, the step of operating in the presence of a vaporous hydrogen halide.

2. In the polymerization of olefines of the general formula $(C_nH_{2n})$ with the aid of boron fluoride, the step of operating in the presence of vaporous hydrogen fluoride.

3. In the polymerization of olefines with the aid of boron fluoride, the step of operating in the presence of a hydrogen halide produced in the reaction itself.

4. In the polymerization of olefines with the aid of boron fluoride, the step of operating in the presence of hydrogen fluoride produced, at least in part, by the reaction of water vapor on the aforesaid boron fluoride.

5. A process for the polymerization of propylene, which comprises shaking moist propylene together with boron fluoride.

6. A process for the polymerization of propylene, which comprises shaking about 100 parts of moist propylene with about 3 parts of boron fluoride at about room temperature.

7. In the polymerization of an olefine gaseous under normal conditions of temperature and pressure with the aid of boron fluoride, the step of operating in the presence of a vaporous hydrogen halide.

8. In the polymerization of an olefine gaseous under normal conditions of temperature and presure with the aid of boron fluoride, the step of operating in the presence of vaporous hydrogen fluoride.

In testimony whereof we have hereunto set our hands.

FRITZ HOFMANN.
MICHAEL OTTO.
WALTER STEGEMANN.